(12) United States Patent
Watson et al.

(10) Patent No.: US 8,621,874 B2
(45) Date of Patent: Jan. 7, 2014

(54) TURBOMACHINE CORE COUPLING ASSEMBLY

(75) Inventors: Bill Russell Watson, Scottsdale, AZ (US); Max Warden, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 955 days.

(21) Appl. No.: 12/547,313

(22) Filed: Aug. 25, 2009

(65) Prior Publication Data

US 2011/0048029 A1 Mar. 3, 2011

(51) Int. Cl.
*F02C 7/20* (2006.01)
(52) U.S. Cl.
USPC ............... 60/796; 60/797; 60/226.1; 244/54; 248/554; 248/555; 415/191; 415/211.2; 415/220
(58) Field of Classification Search
USPC ............ 60/796, 797, 226.1; 244/54; 248/554, 248/555; 415/191, 211.2, 220
See application file for complete search history.

(56) References Cited

U.S. PATENT DOCUMENTS

| | | | |
|---|---|---|---|
| 3,007,308 A * | 11/1961 | Rahaim et al. | 60/800 |
| 3,952,973 A | 4/1976 | James | |
| 4,022,018 A * | 5/1977 | Tuten et al. | 60/200.1 |
| 4,326,682 A | 4/1982 | Nightingale | |
| 4,683,717 A | 8/1987 | Naud | |
| 4,766,723 A * | 8/1988 | Newton | 60/797 |
| 5,088,279 A * | 2/1992 | MacGee | 60/226.1 |
| 5,176,339 A | 1/1993 | Schmidt | |
| 5,226,288 A | 7/1993 | Cornax | |
| 5,452,575 A | 9/1995 | Freid | |
| 6,134,880 A * | 10/2000 | Yoshinaka | 60/226.1 |
| 6,401,448 B1 | 6/2002 | Manteiga et al. | |
| 6,935,591 B2 * | 8/2005 | Udall | 244/54 |
| 7,114,917 B2 * | 10/2006 | Legg | 415/137 |
| 2008/0135679 A1 | 6/2008 | Udall | |

* cited by examiner

*Primary Examiner* — Phutthiwat Wongwian
*Assistant Examiner* — Steven Sutherland
(74) *Attorney, Agent, or Firm* — Ingrassia Fisher & Lorenz, P.C.

(57) ABSTRACT

A coupling assembly for an engine core of a turbomachine is provided. The coupling assembly comprises a duct having a substantially circular shape and surrounding the engine core, and a plurality of coupling struts, each coupling strut extending only in a substantially vertical direction relative to the direction of gravity when the engine core is at a rest position with zero pitch and zero roll, each of the plurality of coupling struts coupling the engine core to the duct.

15 Claims, 12 Drawing Sheets

TURBOMACHINE CORE COUPLING ASSEMBLY

TECHNICAL FIELD

Embodiments of the subject matter described herein relate generally to turbomachinery, such as turbofan engines. More particularly, embodiments of the subject matter relate to coupling assemblies connecting the core of such a turbomachine to a surrounding housing.

BACKGROUND

Turbomachines, such as those in turbofan, turbojet, and other turbine engines often experience forces during operation which can affect the clearances between operating components. For example, an aircraft can perform maneuvers during flight which cause bending in the components due to their inertia. To accommodate bending from normal operations, components of the aircraft engine have spacing between them. For example, an engine core having a rotating shaft with radial airfoils may be enclosed by a housing. To accommodate bending in the housing of the core, a space may be present between the airfoil tips and the housing. The components may be spaced apart further than they would otherwise to permit bending of the housing.

This spacing, also known as a clearance or tolerance, has the disadvantage of reducing the efficiency of the engine, or other turbomachine. In the example of the rotating shaft, air can travel around the airfoils by passing between the airfoils and the housing, rather than travelling over an airfoil, as desired. Accordingly, the efficiency of the engine is reduced as less work is extracted from the passing air by the airfoils.

A typical approach to reducing the required clearances between components is to couple the ends of the housing of the core of the engine to surrounding components, such as a bypass duct. Unfortunately, rotating elements within the core are not supported in the same way as the housing of the core. Thus, restraining the housing of the engine core can cause the housing of the engine core to bend around the central rotating shaft, which remains relatively straight. As a result, the airfoils will approach undesirably close to the interior of the housing.

BRIEF SUMMARY

A coupling assembly for an engine core of a turbomachine is provided. The coupling assembly comprises a duct having a substantially circular shape and surrounding the engine core, and a plurality of coupling struts, each coupling strut extending only in a substantially vertical direction relative to the direction of gravity when the engine core is at a rest position with zero pitch and zero roll, each of the plurality of coupling struts coupling the engine core to the duct.

A coupling assembly for an engine core surrounded by a duct is also provided. The coupling assembly comprises a plurality of coupling struts, the plurality of coupling struts extending only in a substantially vertical direction relative to the direction of gravity when the engine core is at a rest position with zero pitch and zero roll, each of the plurality of coupling struts coupling the engine core to the duct.

Another coupling assembly for an engine core of a turbomachine is provided. The engine core is at least partially surrounded by a duct. The coupling assembly comprises a plurality of coupling struts extending only in a direction substantially parallel to a downward direction of gravity when the engine core is at a rest position with zero pitch and zero roll, each of the plurality of coupling struts coupled to the engine core and to the duct and adapted to inhibit vertical movement of the engine core.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
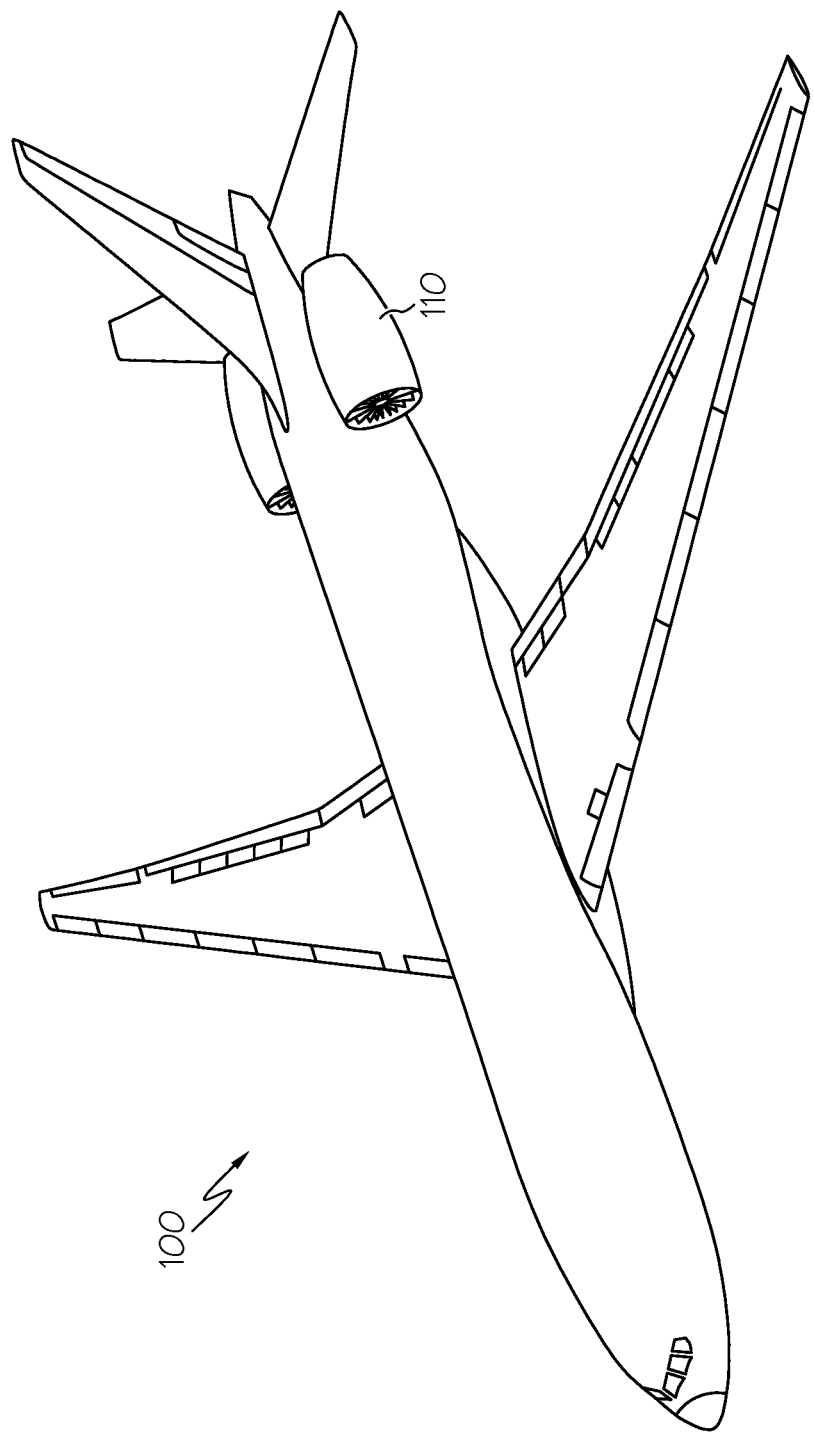
FIG. 1 is a perspective view of an aircraft with an embodiment of a turbine engine.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures depict exemplary arrangements of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

FIG. 1 illustrates an embodiment of an aircraft 100 with a turbofan engine 110. Although described in the context of the aircraft 100, various features and characteristics provided can be used in other contexts and with a variety of equipment. For example, although the engine 110 is particular to the aircraft 100, various engines, as well as different types of turbomachinery, can benefit from the features described below. Thus, no particular feature or characteristic is constrained to an aircraft or turbofan engine, and the principles could be equally embodied in other vehicles, such as automobiles, or equipment, such as power generators or compressors, and so on.

Figure 2:
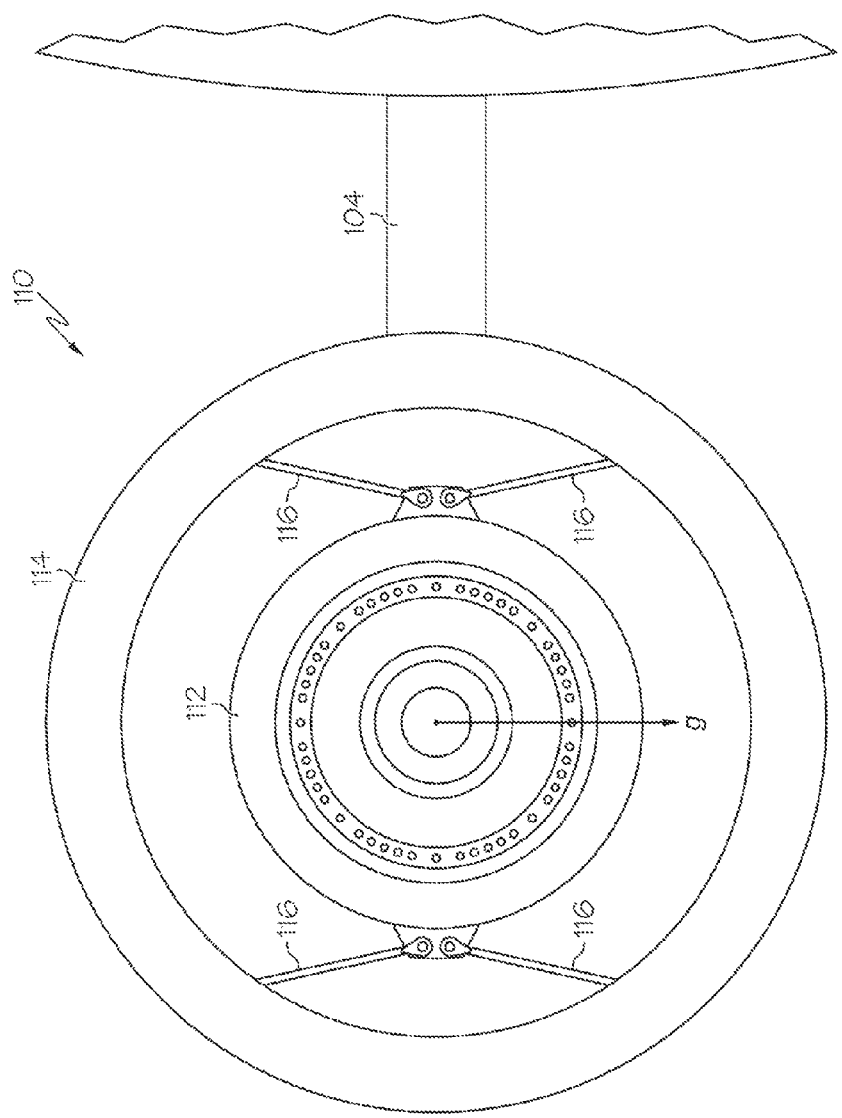
FIG. 2 is a rear view of the turbine engine of the aircraft of FIG. 1.

The aircraft 100 is powered by the engine 110, which can provide both a motive force as well as electrical and hydraulic power generation. Additionally, the engine 110 can supply high pressure and/or high temperature air to various other components and system of the aircraft 100, if desired. As shown, the engine 110 can be coupled to the aircraft 100 on the side of the aircraft 100. Thus, the engine 110 can provide a motive force alongside the aircraft 100 which can be transmitted to the aircraft 100 through a mounting 102. FIG. 2 illustrates a rear view of the aircraft 100 and engine 110, wherein the mounting 104 is visible.

Also visible in FIG. 2 are various features of the engine 110, such as the engine core 112 and bypass duct 114, as well as a mounting assembly comprised of a number of coupling struts 116. The engine core 112 typically contains a number of components and systems, some of which will be described in greater detail below. Although illustrated as the sole component surrounding and enclosing the engine core 112, the bypass duct 114 can itself be partially or entirely surrounded and/or enclosed and/or shrouded by additional components. Such additional elements are omitted for clarity of depiction and description.

The engine core 112 can comprise a number of systems and/or components, including one or more rotors and/or shafts, including those supporting airfoils, support assemblies, such as bearing assemblies, coupling components, fuel and combustion components and systems, one or more exterior mixer lobes, and so on. The engine core 112 can have different components in different embodiments. The engine core 112 can perform various functions involved with power and motive force generation, including the compression, combustion, and expansion operations of a turbine engine. Thus, for example, the engine core 112 can include a rotating shaft with a plurality of radial airfoils over which compressed and/or heated air can flow.

The engine core 112 can be rigidly and/or pivotally coupled to the bypass duct 114 and/or a mounting frame at the front of the engine core 112. Accordingly, in certain embodiments, the engine core 112 can be cantilevered from the front of the engine 110 as it extends toward the rear of the engine 110. Thus, without further coupling members, the engine core 112 can be free to deflect and bend, similar to a cantilevered beam.

As mentioned, the bypass duct 114 can enclose and surround the engine core 112. The bypass duct 114 can provide structural support for the engine core 112, including coupling locations for the plurality of coupling struts 116. The bypass duct 114 can perform additional operations or have other beneficial features, such as confining and/or directing a flow of air or compressed air useful in other operations of the engine 110.

Figure 3:
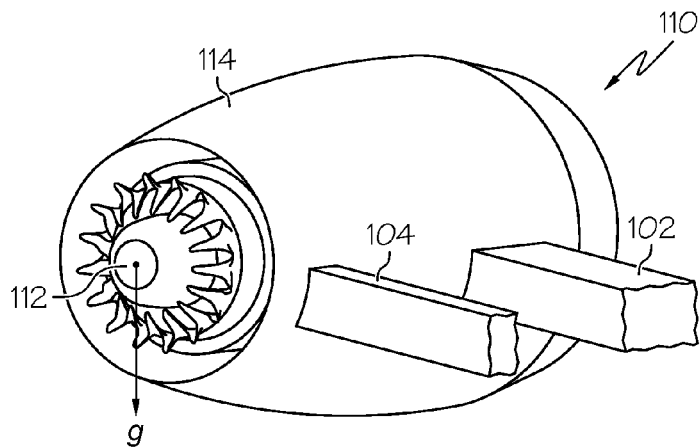
FIGS. 3-5 are perspective rear views of the turbine engine of the aircraft of FIG. 1 in different states.
Figure 4:
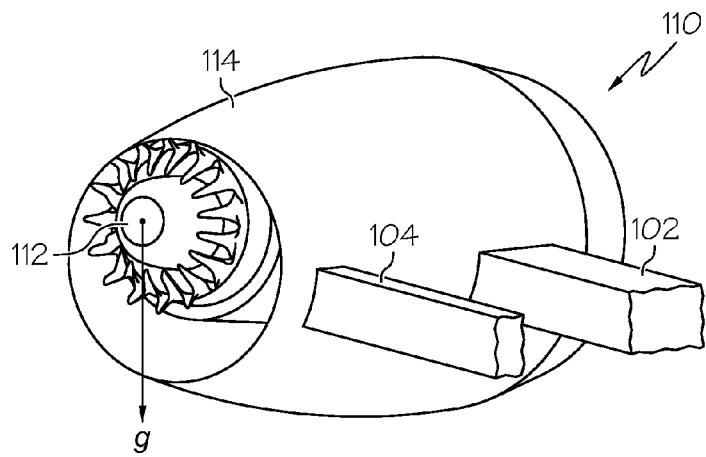
Figure 5:
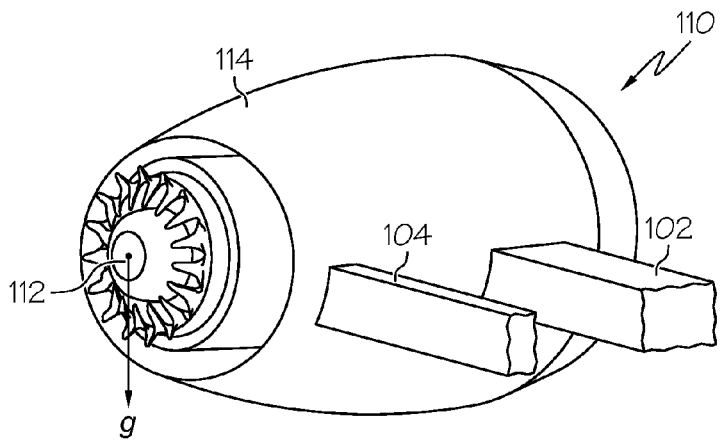

FIGS. 3-5 illustrate the engine 110 wherein the engine core 112 is in several different positions as a result of various forces acting on the engine 110. In each, the downward direction of gravity acting on the engine core 112 is shown and indicated with a g. It should be understood that the deflection of the engine core 112 shown in FIGS. 4 and 5 is greatly exaggerated for illustrative clarity and that, relative to the size of the components, deflection of the engine core 112 is in actuality much smaller, and in some cases may not be visible to the unaided eye. Additionally, for purposes of describing the effects of various forces on the engine 110, including deflection of the engine core 112, the coupling struts 116 are omitted.

FIG. 3 illustrates the engine 110 with the engine core 112 in an unloaded position. The bypass duct 114 is shown substantially concentric around, and co-axial with, the engine core 112.

FIG. 4 illustrates the engine 110 undergoing vertical, or maneuver-induced, bending. In the context of the aircraft 100, maneuver-induced bending occurs when the aircraft 100 executes a maneuver, such as an altitude increase or decrease. FIG. 4 illustrates such a maneuver, that of an altitude decrease. The bypass duct 114 remains substantially rigid relative to the aircraft 100 because the connections to the aircraft body by the mounting 102 and rear mounting 104 are rigid, as well as the overall stiffness of the bypass duct 114. The inertia of the engine core 112, however, causes it to tend to remain at a higher altitude than the rest of the engine 110. Relative to the bypass duct 114, this results in an apparent rise in the engine core 112 from its undeflected position.

FIG. 5 illustrates the engine 110 undergoing horizontal, or thrust-induced bending. Because the engine 110 generates a forward force, the force is resisted at the front by the mounting 102, which is coupled to the forward frame, as shown in FIGS. 6-10, and described in greater detail below. Because the mounting 102 reacts the forward force of thrust out of plane with the application of engine thrust, a moment is generated. The moment results in an outward bowing of the engine 110, away from the body of the aircraft 100, as described in greater detail below.

The engine core 112, however, is cantilevered from the forward frame. As the forward frame bends at an angle to the aircraft 100, the engine core 112 correspondingly is moved to angle away from the aircraft 100, as shown in FIG. 5. The rear mounting 104 constrains the outward bowing of the bypass duct 114, however, resulting in an offset of the rear of the engine core 112 relative to the center of the bypass duct 114, as shown.

Figure 6:
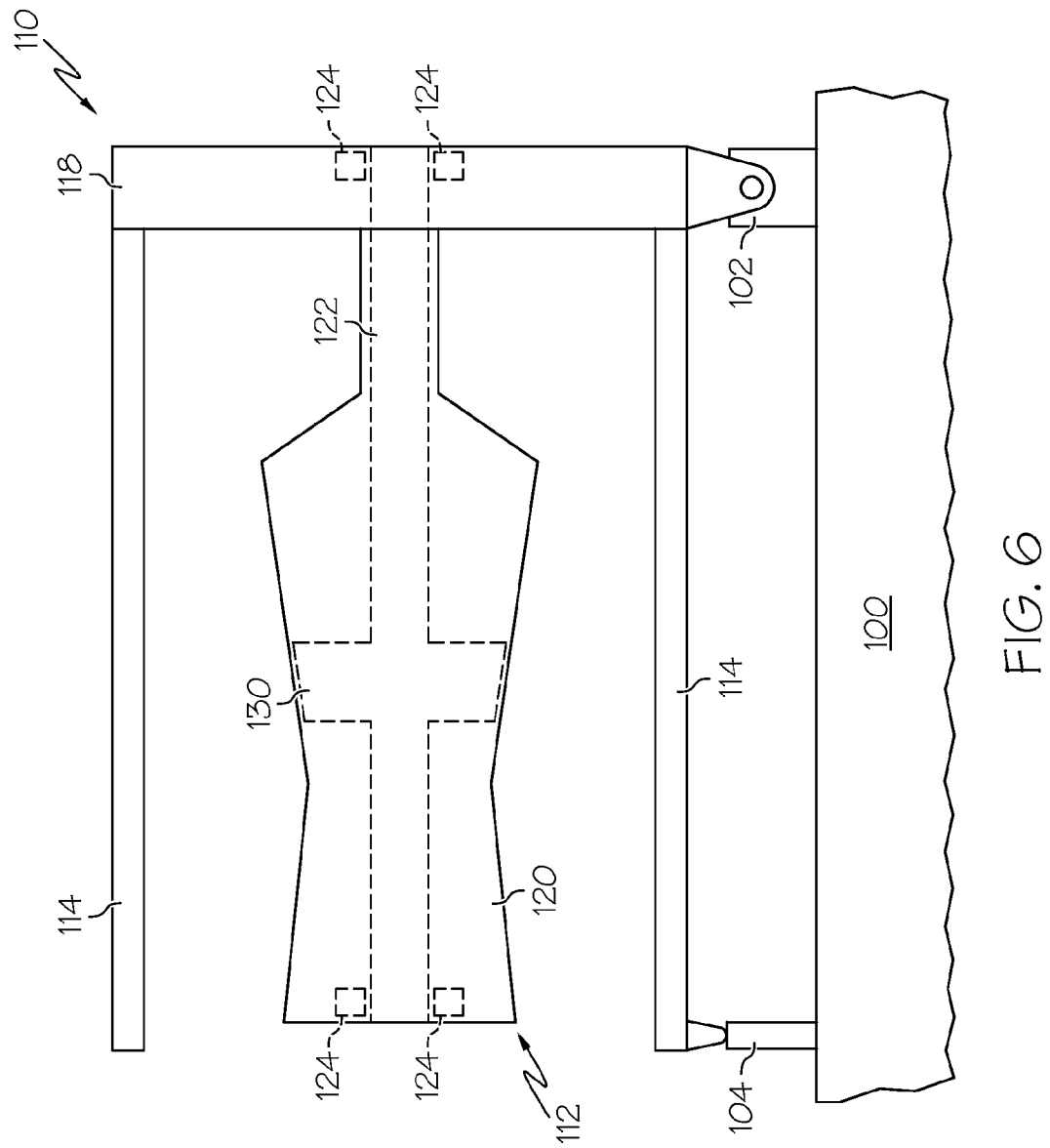
FIGS. 6-10 are cross-sectional side and top views of the turbine engine of the aircraft of FIG. 1 in different states.

FIG. 6 illustrates a cross-sectional top view of the engine 110 depicting the relationship of certain components for descriptive purposes. It is should be understood to be simplified and omitting various systems and components unrelated to the descriptive purpose, and is not a true and exact depiction of an engine 110.

The engine core 112 is coupled to the forward frame 118, as shown, and can extend as a cantilever therefrom. The forward frame 118 can be coupled to the bypass duct 114 and to the mounting 102, which can couple the engine 110 to the aircraft 100. The bypass duct 114 can additionally be coupled to the aircraft 100 by the rear mounting 104.

Among other components, the engine core 112 can include a core housing 120, a rotating shaft 122, and bearing mounts 124 supporting the shaft 122. The shaft 122 can have an airfoil section 130 including numerous airfoils extending radially outward from the shaft 122. The bearing mounts 124 preferably support the shaft 122 such that it is free to rotate. The bearing mounts 124 can support the shaft 122, which is not directly supported by the bypass duct 114 and/or mounting 102. In an actual engine 110, the components can have a different configuration, size, and so on. For example, the shaft 122 can be a hollow cylinder, or tube, rather than the solid cylinder depicted. Alternatively, or additionally, in some embodiments, the airfoil section 130 can extend outside the core housing 120 and have a clearance with the interior of the bypass duct 114.

As can be seen, the distance between the airfoil section 130 and the core housing 120 is preferably small. During operation, air can travel through the engine core 112, within the core housing 120, across the airfoil section 130. The air can travel over the airfoil section 130, causing it to turn, resulting in turning of the shaft 122. The efficiency of this operation increases as the clearance between the airfoil section 130 and core housing 120 is reduced, causing as much air to pass over the airfoil section 130 as possible.

Figure 7:
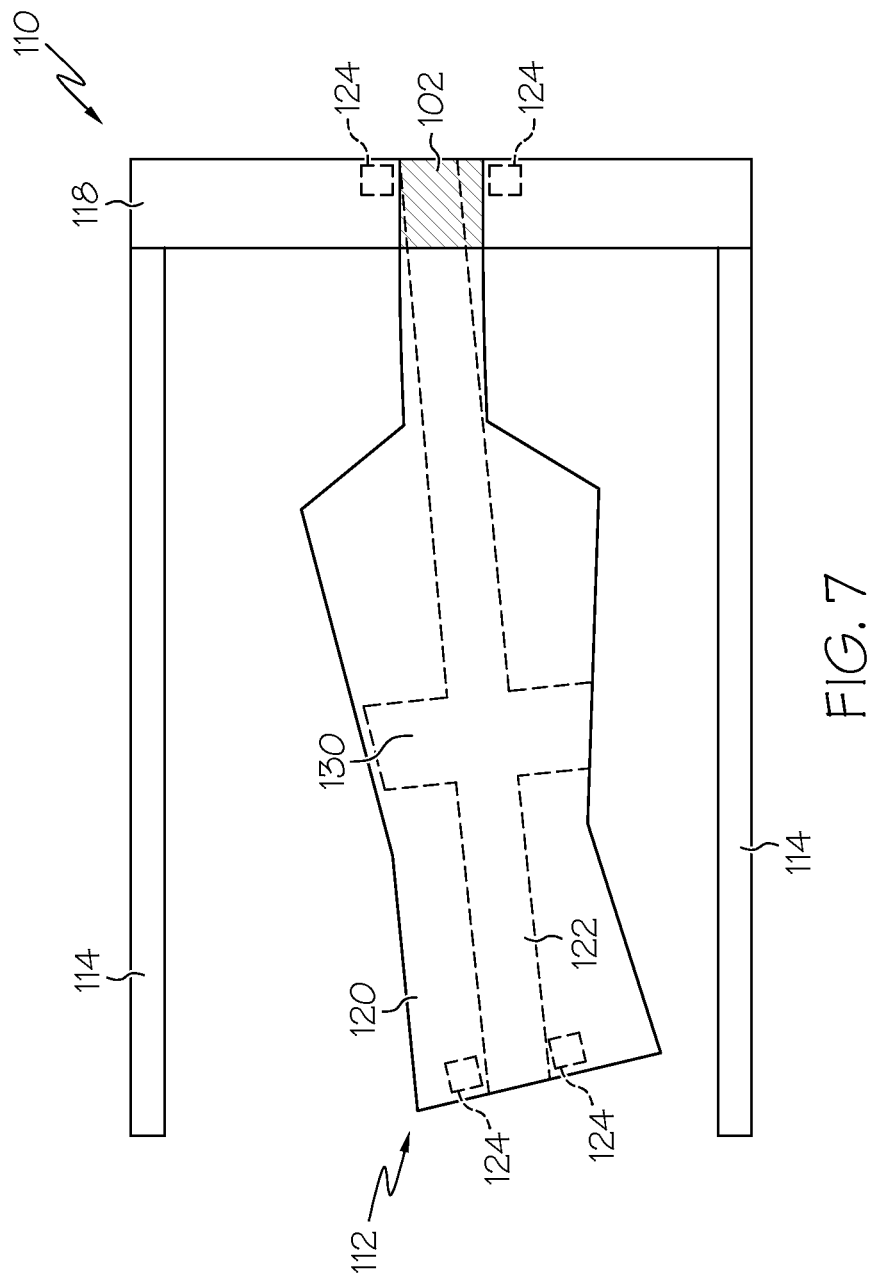

FIG. 7 illustrates a cross-sectional side view of an embodiment of an engine 110 experiencing maneuver-induced bending in a downward direction, such as would be associated with an altitude increase of the aircraft 100. It should be understood that the bending of components illustrated in FIGS. 7-10 is greatly exaggerated for ease of viewing. In practice, the bending and deflections experienced by the illustrated components may be much smaller, relative to their size and shape, and may not be visible to the unaided eye. Although illustrated as straight, the bypass duct 114 may exhibit some bending during the maneuver. This bending of the bypass duct 114 is omitted for clarity.

The engine core 112 can be seen to bend in a downward direction under its inertia during a maneuver. As the engine core 112 bends downward, the rear bearing 124 is deflected downward. The forward bearing 124, however, remains relatively stationary. As a result, the bearings 124 are no longer co-axial with the undeflected center of the engine 110 or engine core 112. Because the shaft 122 is supported only by the bearings 124 and relatively stiffer than the engine core 112 as a whole, the shaft 122 does not experience bending to the same degree, and maintains a substantially straight shape. Therefore, the core housing 120 is being deflected downward, whereas the shaft 122 is maintaining a relatively straight shape. Accordingly, the airfoil section 130 is moved closer to the core housing 120 on one side, and farther from the core housing 120 on the other side. To accommodate this movement, additional clearance may be required in the undeflected, unloaded configuration. Consequently, efficiency may be reduced. Moreover, where the airfoil section 130 moves away from the core housing 120, the larger clearance allows passage around the airfoil section 130, rather than across the airfoils, which is less desirable.

Figure 8:
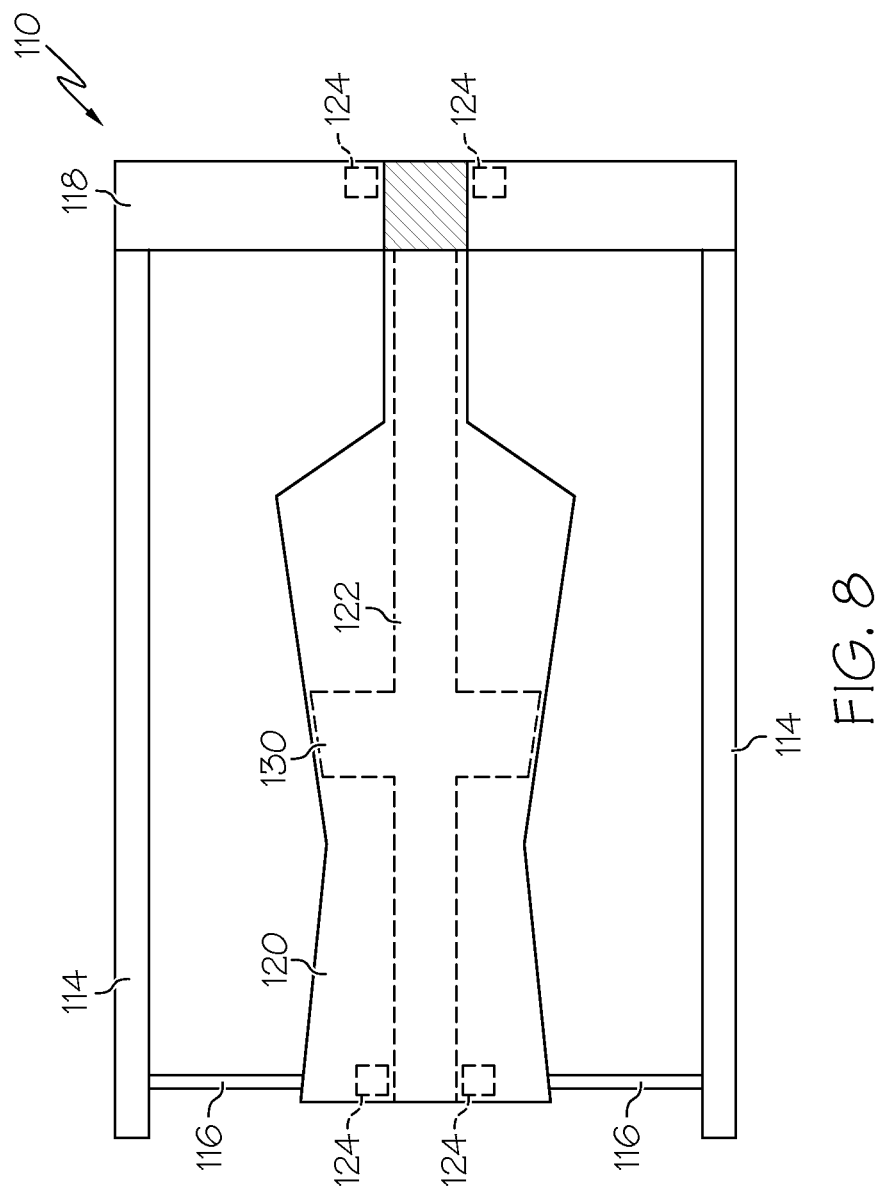

FIG. 8 illustrates the cross-sectional side view of FIG. 7, except that the vertically-extending coupling struts 116 are shown in the proper position to support the rear of the engine core 112. The coupling struts 116 can experience compression in the lower struts and tension in the upper struts, thereby inhibiting downward bending of the rear of the engine core 112. As a result, the engine core 112 can remain relatively straight and unbent. Consequently, the shaft 122 can maintain a relatively co-axial position with the center of the engine core 112. Therefore, the airfoil section 130 will maintain its position relative to the interior of the core housing 120, and the required clearance can be reduced, thereby improving the efficiency of the engine 110.

Figure 9:
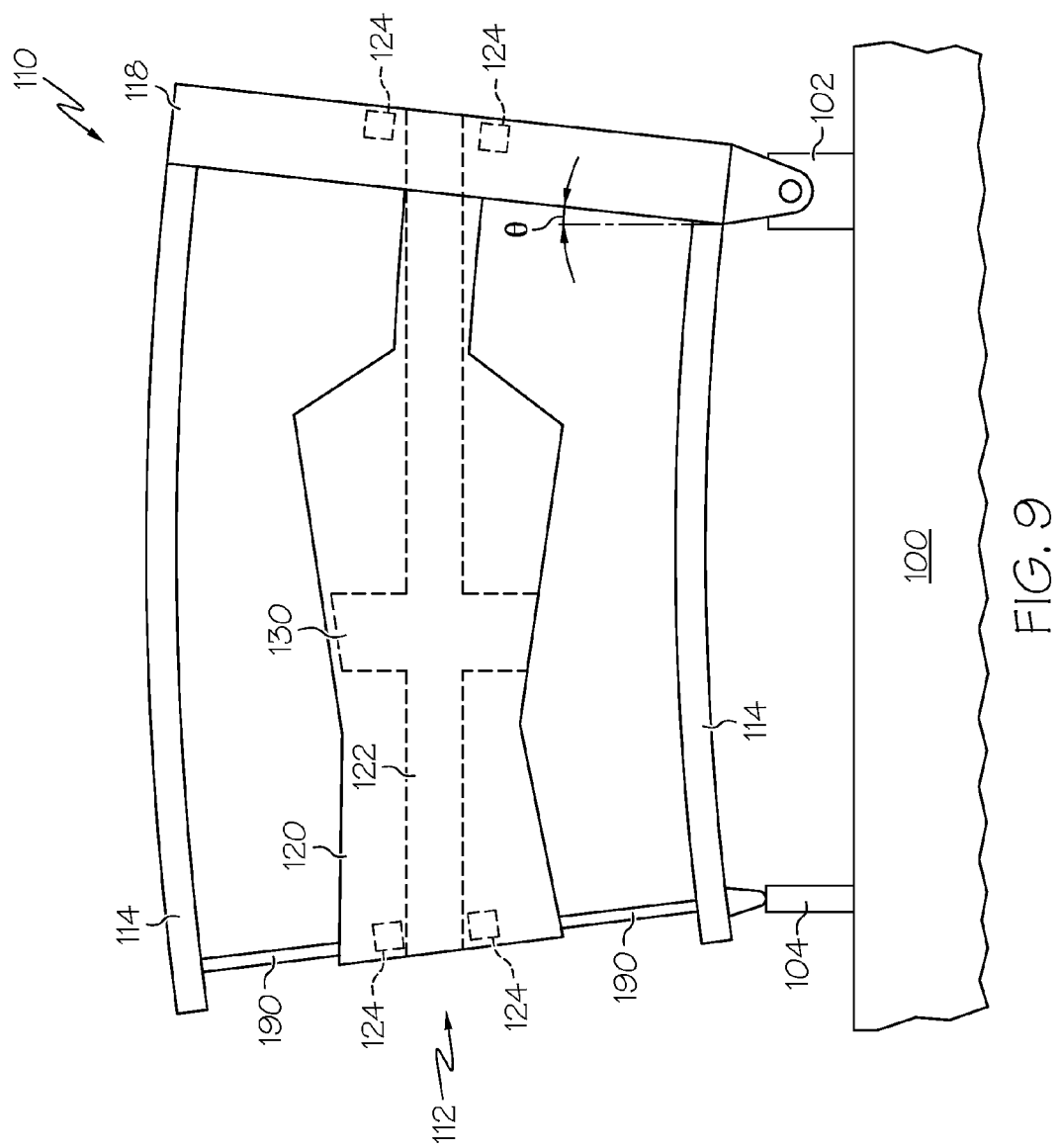

FIG. 9 illustrates a cross-sectional top view of the engine 110 operating under a thrust-induced load. The forward frame 118 is coupled to the mounting 102, which is in turn coupled to the aircraft 100. The bypass duct 114 is coupled to the forward frame 118, but also coupled to the aircraft 100 by the rear mounting 104. During operation, the engine 110 can produce thrust in a forward direction, to the right of the illustrated engine 110. The thrust of the engine 110 can provide the motive force for the aircraft 100. The thrust is resisted by the forward frame 118, to which the bypass duct 114 and engine core 112 are coupled. Resisting the thrust of the engine 110 through the forward frame 118 is the mounting 102. Because the mounting 102 resists the force in a position off-axis from the thrust, a movement around the mounting 102 is generated, in addition to a shear force. The moment causes the forward frame 118 to bend towards the right relative to its unloaded state, by the angle θ, as shown. Similarly, the bypass duct 114 will bend away from the body of the aircraft 100.

The engine core 112, however, is coupled to the forward frame 118 by a cantilever coupling. Accordingly, the central axis of the engine core 112 is angled away from the aircraft towards the front of the engine core 112. FIG. 9 illustrates several coupling struts 190 coupling the rear of the engine core 112 to the bypass duct 114 in a horizontal direction. Coupling struts 190 are not present in earlier illustrations and are used solely to illustrate the effect of horizontal struts on thrust-induced loads.

Coupling struts 190 extend from the bypass duct 114 to the engine core 112 and support tension and compression to maintain the position of the engine core 112 relative to the bypass duct 114. Because the front of the engine core 112 is bending outward, however, the result is an arc-shaped engine core 112, as shown. Consequently, the location of the core housing 120 relative to the airfoil section 130 is altered. The inboard side of the airfoil section 130 is closer to the core housing 120 than the outboard side. To prevent the airfoil section 130 from impinging on the interior surface of the core housing 120, additional clearance may be required between the airfoil section 130 and the core housing 120. Disadvantageously, this increased clearance can reduce the efficiency of the engine 110.

Figure 10:
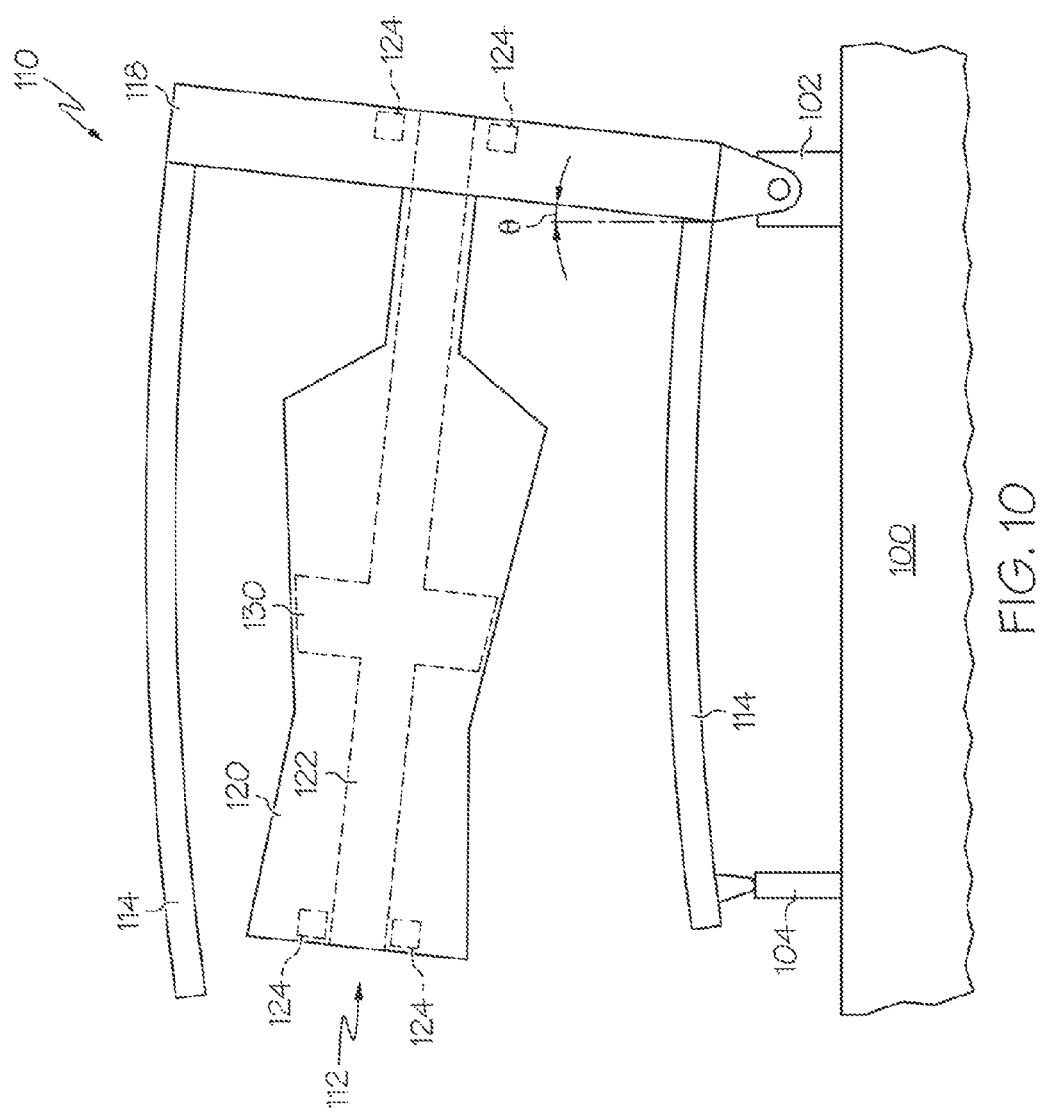

FIG. 10 illustrates a cross-sectional top view of the engine 110 of FIG. 9, in the thrust-loaded state, with the coupling struts 190 removed. As can be seen, although the bypass duct 114 continues to bend, and the forward frame 118 remains at an angle θ relative to its unloaded position, removal of the coupling struts 190 permits the engine core 112 to maintain a straight shape. Consequently, the bearings 124 support the shaft 122 along a straight line through the central axis of the engine core 112. Therefore, no additional clearance is required between the airfoil section 130 and the bypass duct 114. Accordingly, the efficiency of the engine 110 is not decreased by additional clearance.

As can be seen in FIGS. 6-10, it is desirable to have an engine coupling assembly which provides tension and compression to resist displacement of the engine core in a vertical direction, such as maneuver-induced bending, while permitting the engine core to displace in a horizontal direction, such as when experiencing thrust-induced bending. With reference back to FIG. 2, a coupling assembly comprising a plurality of coupling struts 116 extending only in a substantially vertical direction is shown. Such a configuration provides the desired reaction characteristics to minimize clearances between the airfoil section 130, or other rotating component, and core housing 120, or other surrounding component. The vertical direction is relative to the direction of gravity.

Figure 11:
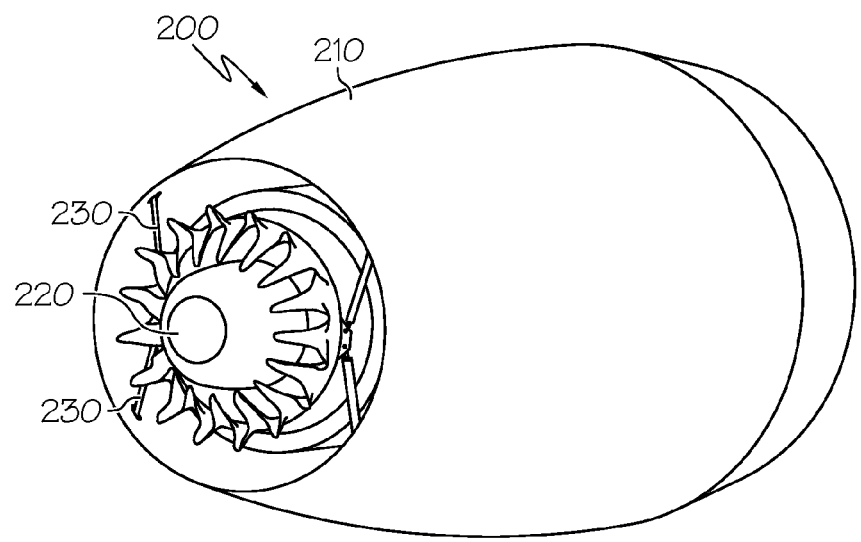
FIG. 11 is a rear perspective view of embodiments of a turbine engine and of a coupling assembly for the turbine engine.

FIG. 11 illustrates a perspective view of the rear of an engine 200 having an engine coupling assembly comprising a plurality of coupling struts 230 embodying certain features described below. Although four coupling struts 230 are used in the exemplary embodiment, more or fewer struts can be present in various embodiments, as later shown and described. Unless described otherwise, the engine 200 can have features and properties similar to those described above with regard to FIGS. 1-10 and engine 110. The engine 200 comprises a bypass duct 210 and an engine core 220, among other components and systems. As explained above, such additional components and systems are omitted for clarity. Certain embodiments of the engine 200 can have more or different components and features without departing from the spirit of the embodiments described herein.

Four coupling struts 230 are provided for coupling the engine core 220 to the bypass duct 210 by transmitting force only in a substantially vertical direction. Preferably, the coupling struts 230 are rigid members. The coupling struts 230 can be composed of any appropriate material, including metals of various types, such as high-strength metals which retain their strength at high temperatures. For example, a nickel- or cobalt-based superalloy can be used, along with other metals, as desired for the embodiment.

The coupling struts 230 can be coupled to the engine core 220 on a lateral side. Such a lateral side can be approximately 90° in either direction around the engine core 220 from the downward direction of gravity, g. The coupling sites on the engine core 220 do not have to be at exactly 90° to either side, and can be offset to either side, as desired for the embodiment.

Figure 12:
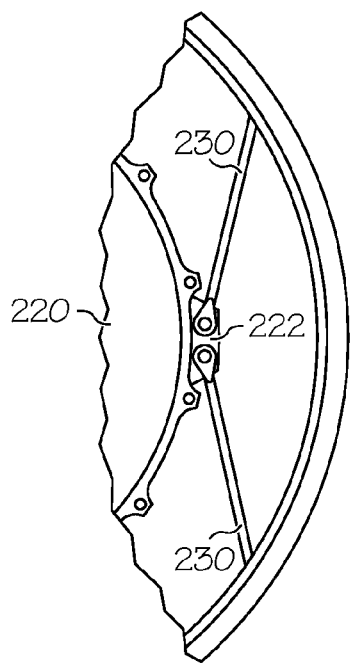
FIG. 12 is a detailed view of the embodiments of the turbine engine and of the coupling assembly of FIG. 11.

Preferably, the coupling struts 230 are coupled to the engine core 220 at a mounting bracket or other such assembly designed to receive the coupling struts 230. FIG. 12 illustrates a detailed view of a portion of FIG. 11 in which such a mounting bracket 222 is shown. In some embodiments, the coupling struts 230 can be coupled to the engine core 220 with a fastener or fasteners, such as a pin, nut and bolt assembly, threaded member, or other desired coupling technique. The coupling struts 230 can be coupled directly to the engine core 220 or to an intermediary coupling device, if desired.

In certain embodiments, the coupling struts 230 can have an adjustable length, while in other embodiments, they can be rigid, fixed members which cannot be adjusted.

Figure 13:
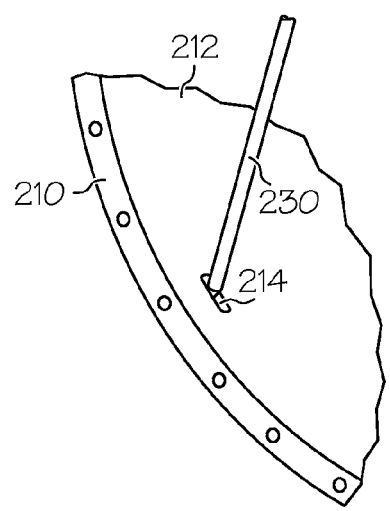
FIG. 13 is another detailed view of the embodiments of the turbine engine and of the coupling assembly of FIG. 11.

FIG. 13 illustrates a detailed view of a portion of FIG. 11 showing the connection between a coupling strut 230 and the bypass duct 210. In at least some embodiments, the bypass duct 210 can have an interior surface 212 which faces the engine core 220. The interior surface 212 can have one or more ports 214, through which at least a portion of the coupling strut 230 can extend. It can be desirable to avoid protruding any portion of a coupling connection between the coupling strut 230 and bypass duct 210 inward toward the engine core 220 beyond the interior surface 212. High-temperature and/or high-pressure air can travel along the interior surface 212, which can have deleterious effects on such the physical components of couplings, as well as reducing efficiency. Additionally, in certain embodiments, at least some of the coupling struts 230 can have cross-sectional shapes selected to affect their aerodynamic response to air traveling within the bypass duct 210. For example, some coupling struts 230 can have a cross-sectional shape similar to an airfoil, while others can have a teardrop shaped cross-section, or a circular cross-section, or an oblong or oval cross-section, and so on.

Figure 14:
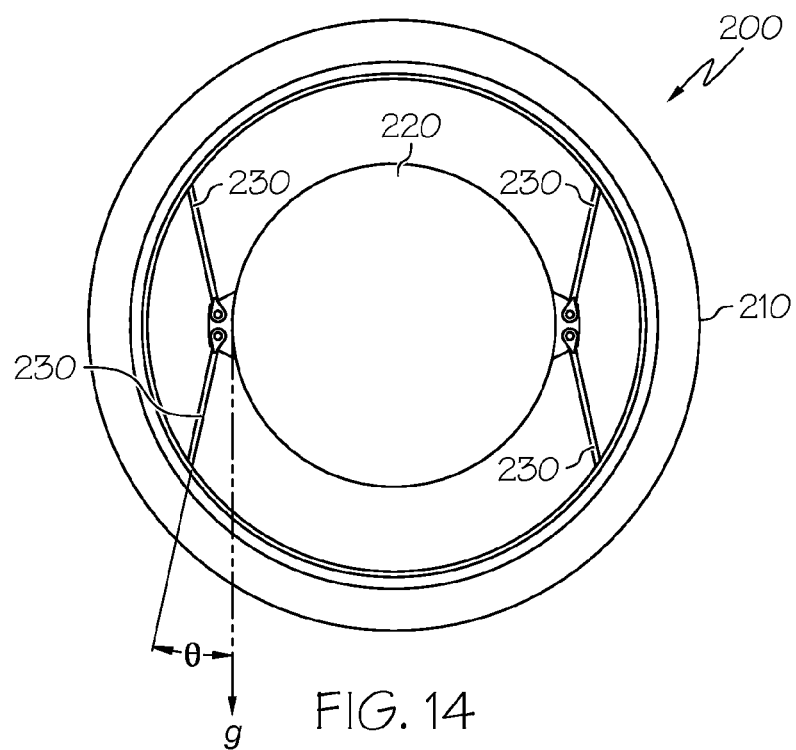
FIG. 14 is rear view of the embodiments of FIG. 11.

FIG. 14 illustrates an exemplary configuration of coupling struts 230 from a rear view of the engine 200. As can be seen, each coupling strut 230 extends only in a substantially vertical direction relative to the direction of gravity, g, when the engine 200 is at a rest position. Preferably, each coupling strut 230 is substantially parallel to the direction of gravity, such that the angle θ formed between a coupling strut 230 and the downward direction of gravity is equal to or less than 30°. In certain embodiments, the angle θ can be 0°, where a coupling strut 230 runs in an exactly vertical direction. In other embodiments, the angle θ can be anywhere between 0° and 30°, inclusive, as desired. Preferably, no coupling strut 230 extends in a horizontal or substantially horizontal direction.

All references to a vertical direction or horizontal direction are to be understood to in the context of a stationary aircraft at a rest position of zero pitch and zero roll and otherwise level relative to the surface of the Earth. Additionally, such references applying to components of an engine or engine core or other component thereof are also to be understood to be in reference to a rest position wherein the engine, engine core, other component, or aircraft or other vehicle to which the engine or sub-component is coupled is flat and level relative to the surface of the Earth. Although vehicles may experience gravity in different directions relative to the components during operation, references for directions are made only in the rest position, flat and level on the Earth.

Moreover, the engines, including subcomponents, are illustrated separated from the body of any aircraft. It should be understood that, when mounted, the downward direction of gravity can be in a different direction. For example, an engine, such as the one shown in FIG. 14, can be mounted substantially horizontally from the aircraft body. In such a mounted position, the direction of gravity, g, will be substantially the same. As another example, the engine can be mounted at an angle to the substantially horizontal direction, resulting in an angle between the illustrated downward direction of gravity in FIG. 14 and the actual downward direction of gravity when mounted. Such mounting angles are contemplated with any of the embodiments disclosed herein.

FIGS. 15-18 illustrate various alternative embodiments of engines having a coupling assembly comprising a plurality of coupling struts in various configurations. Unless described otherwise, each described engine can have features and properties similar to those described above with regard to FIGS. 1-10 and engine 110.

Figure 15:
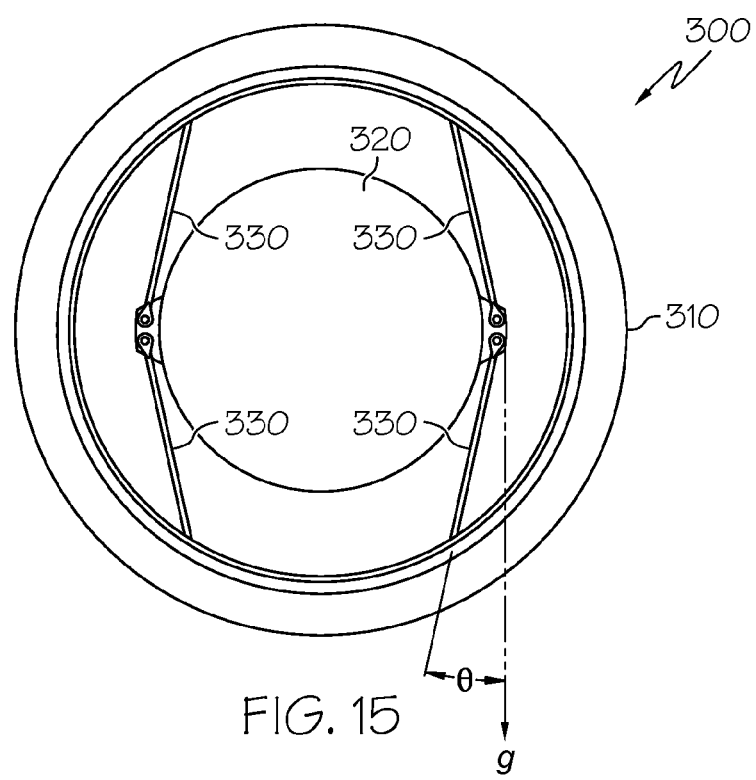
FIGS. 15-18 are various other embodiment of coupling assemblies for a turbine engine with an engine core.

As can be see in FIG. 15, in addition to the four coupling struts previously illustrated, the coupling struts 330 can also extend at a different angle from the downward direction of gravity, g. Preferably, however, the angle formed with the downward direction of gravity, θ, is less than 30°, regardless of the direction of extension of the struts 330. As the engine 300 operates, the engine core 320 and bypass duct 310 will undergo thermal expansion. Because the engine core 320 experiences a higher operating temperature than the bypass duct 310, the engine core 320 undergoes a larger thermal expansion than the bypass duct 310. Advantageously, the struts 330, as with the struts of FIGS. 14, and 16-18 are positioned such that radial expansion of the engine core 320, 220 does not cause direct compressive loading of the struts 330, 230.

Figure 16:
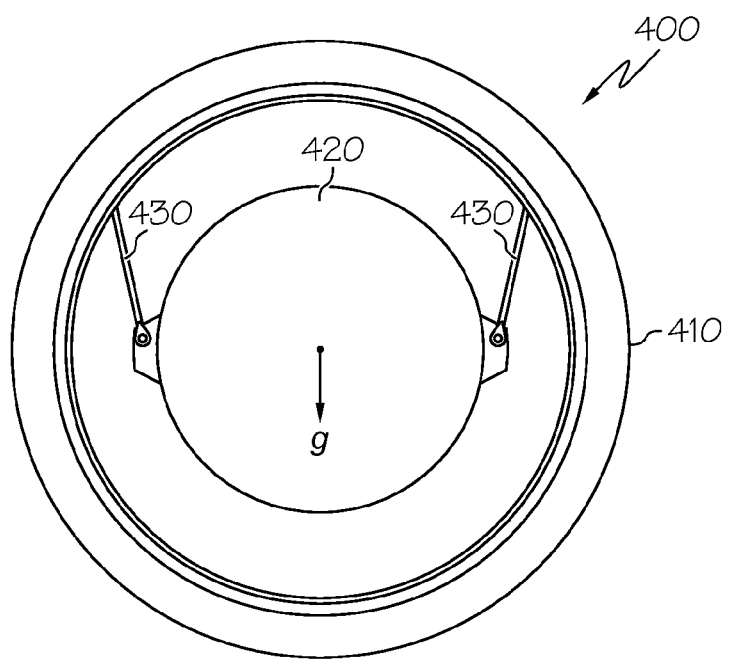

FIG. 16 illustrates an embodiment of an engine 400 wherein two coupling struts 430 couple the engine core 420 to the bypass duct 410. The coupling struts 430 extend only in the upward direction from the lateral sides of the engine core 420.

Figure 17:
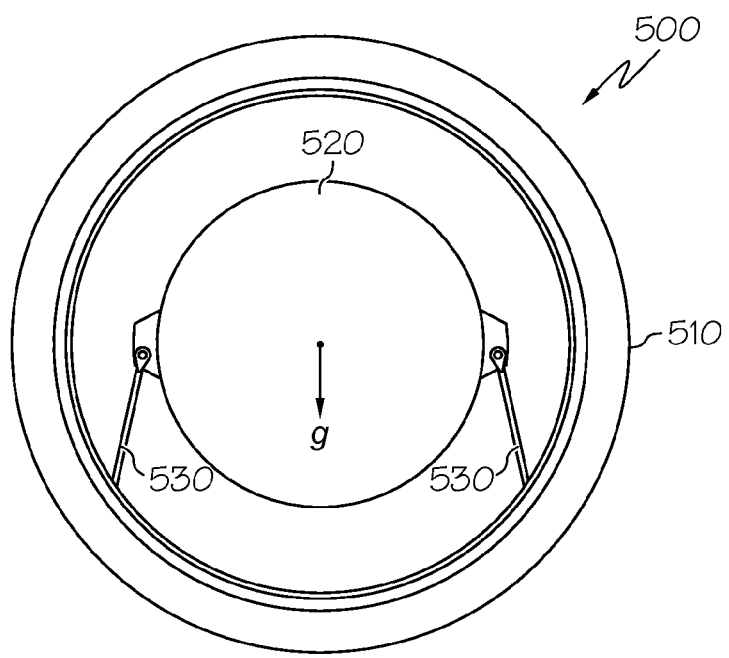

FIG. 17 illustrates an embodiment of the engine 500 wherein two coupling struts 530 couple the engine core 520 to the bypass duct 510. Unlike the engine 400 of FIG. 16, the coupling struts 530 in FIG. 17 extend only downwards, relative to the direction of gravity, in a substantially vertical direction. In either embodiment of FIG. 16 or FIG. 17, as with other embodiments, the angle formed between the coupling struts 430, 530 and the engine core 420, 520 can vary as desired for the embodiment.

Figure 18:
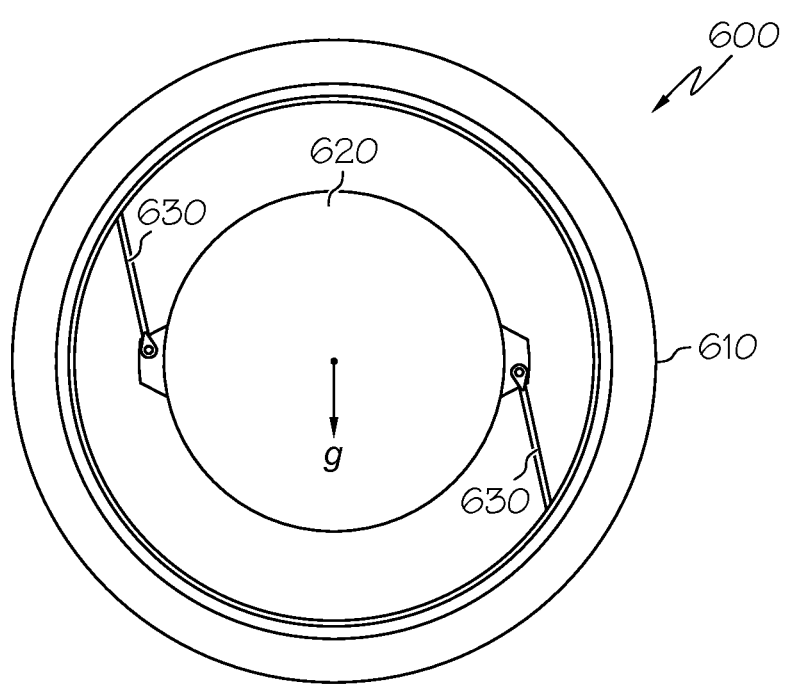

As shown in FIG. 18, coupling struts 630 used to couple an engine core 620 to a bypass duct 610 can be asymmetrical around one or more axes passing through the center of the engine 600. Thus, as shown, one coupling strut 630 can extend downward, relative to the direction of gravity, from a lateral side of the engine core 620, while another extends upwards from the other lateral side.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A coupling assembly for coupling an engine core of a turbomachine to the side of an aircraft, the coupling assembly comprising:
   a duct having a substantially circular shape and surrounding the engine core;
   a forward frame coupled to the duct and a forward portion of the engine core, the forward frame configured to bend with respect to the body of the aircraft in a horizontal direction when the engine core is operating under thrust-induced loads; and
   a plurality of coupling struts coupling the engine core to the duct and positioned around a rear portion of the engine core;
   wherein all of the coupling struts positioned around the rear portion of the engine core extend in a vertical or substantially vertical direction relative to the direction of gravity, when the engine core is at a rest position with zero pitch and zero roll, such that the plurality of coupling struts transmit force only in a substantially vertical direction to (i) inhibit displacement of the rear portion of the engine core in a vertical direction when operating under maneuver-induced loads, and (ii) permit displacement of the rear portion of the engine core in a horizontal direction when operating under thrust-induced loads and the forward frame bends with respect to the body of the aircraft.

2. The coupling assembly of claim 1, wherein the plurality of coupling struts consists of four coupling struts.

3. The coupling assembly of claim 2, wherein the engine core has two lateral sides approximately ninety degrees from a downward direction of gravity and each of the two lateral sides couples to two of the plurality of coupling struts.

4. The coupling assembly of claim 1, wherein the plurality of coupling struts consists of two coupling struts.

5. The coupling assembly of claim 4, wherein the engine core has two lateral sides approximately ninety degrees from the downward direction of gravity, and one coupling strut of the plurality of coupling struts is coupled to each of two lateral sides.

6. The coupling assembly of claim 1, wherein the duct comprises a plurality of coupling brackets, and each of the plurality of coupling struts extends from the engine core to a coupling bracket.

7. The coupling assembly of claim 1, wherein each of the plurality of coupling struts has a cross-section having an airfoil shape.

8. The coupling assembly of claim 1, wherein each of the plurality of coupling struts is composed of a nickel-based superalloy.

9. A coupling assembly for coupling an engine core to the side of an aircraft, the coupling assembly comprising:
   a duct surrounding the engine core;
   a forward frame coupled to the duct and supporting a forward portion of the shaft, the forward frame bending with respect to the body of the aircraft when the engine core is operating under a thrust-induced load; and
   a plurality of coupling struts coupling a rear portion of the engine core to the duct;
   wherein the plurality of coupling struts consists of four or fewer struts each extending only in a substantially vertical direction relative to the direction of gravity when the engine core is at a rest position with zero pitch and zero roll; and
   wherein the plurality of coupling struts are spatially positioned around the rear portion of the engine core such that the coupling struts inhibit movement of the engine core in a vertical direction, while permitting horizontal displacement of the engine core in a horizontal direction.

10. The coupling assembly of claim 9, wherein the duct comprises a plurality of coupling brackets, and each of the plurality of coupling struts extends from the engine core to a coupling bracket.

11. The coupling assembly of claim 9, wherein each of the plurality of coupling struts has a cross-section having an airfoil shape.

12. The coupling assembly of claim 9, wherein the engine core has a downward direction in a direction of gravity, and each of the plurality of coupling struts forms an angle with the downward direction of equal to or less than thirty degrees.

13. The coupling assembly of claim 12, wherein each the engine core has two lateral sides, each approximately ninety degrees from the downward direction, and each of the plurality of coupling struts is coupled to the engine core at a lateral side.

14. An engine configured to be coupled to an aircraft, the engine comprising:
   an engine core having a shaft;

a duct having a substantially circular shape and surrounding the engine core;

a forward frame coupled to the duct and supporting a forward portion of the shaft, the forward frame bending outwardly or inwardly of the aircraft when the engine core is operating under a thrust-induced load; and a plurality of rear coupling struts extending between the duct and a rear portion of the engine core, the plurality of rear coupling struts spatially distributed around the rear portion of the engine core and each extending in a vertical or substantially vertical direction such that the plurality of rear coupling struts (i) inhibits displacement of the rear portion of the engine core in a vertical direction to maintain the shaft in a substantially co-axial position relative to the center of the engine core when operating under maneuver-induced loads, and (ii) permits displacement of the rear portion of the engine core in a horizontal direction in conjunction with the inward or outward bending of the forward frame to maintain the engine core in a substantially straight shape when operating under thrust-induced loads.

15. The engine of claim 14 wherein no coupling strut included in the engine and coupling a rear portion of the engine core to the duct extends in a horizontal or substantially horizontal direction.

* * * * *